US008601985B2

(12) United States Patent
Takahashi et al.

(10) Patent No.: US 8,601,985 B2
(45) Date of Patent: Dec. 10, 2013

(54) EXHAUST GAS COOLING ADAPTER

(75) Inventors: Yukihiro Takahashi, Toyota (JP);
Yoshihisa Shinoda, Susono (JP); Koichi Hoshi, Susono (JP)

(73) Assignees: Nippon Soken, Inc., Nishio (JP); Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 13/362,468

(22) Filed: Jan. 31, 2012

(65) Prior Publication Data
US 2012/0199321 A1 Aug. 9, 2012

(30) Foreign Application Priority Data

Feb. 8, 2011 (JP) .................................. 2011-025124

(51) Int. Cl.
*F01P 9/00* (2006.01)
*F02B 47/08* (2006.01)

(52) U.S. Cl.
USPC ............... 123/41.01; 123/568.12; 123/568.22

(58) Field of Classification Search
USPC .............................. 123/41.01, 568.12, 568.22
See application file for complete search history.

(56) References Cited

U.S. PATENT DOCUMENTS

| 4,206,600 | A | * | 6/1980 | Feuling ............................ 60/312 |
| 4,430,856 | A | * | 2/1984 | Niedert ............................ 60/272 |
| 4,512,148 | A | * | 4/1985 | Jacobson ......................... 60/321 |
| 4,555,904 | A | * | 12/1985 | Melzer et al. ................. 60/605.2 |
| 5,150,572 | A | * | 9/1992 | Johnson et al. ................. 60/272 |
| 2010/0240268 | A1 | * | 9/2010 | Westerbeke, Jr. ........... 440/88 C |

FOREIGN PATENT DOCUMENTS

| JP | U-64-15718 | 1/1989 |
| JP | A-10-317995 | 12/1998 |
| JP | A-2000-291437 | 10/2000 |
| JP | A-2003-227695 | 8/2003 |
| JP | A-2010-190064 | 9/2010 |
| JP | A-2011-196352 | 10/2011 |

\* cited by examiner

*Primary Examiner* — Lindsay Low
*Assistant Examiner* — Charles Brauch
(74) *Attorney, Agent, or Firm* — Oliff & Berridge, PLC

(57) ABSTRACT

The invention relates to an exhaust gas cooling adapter that is arranged between an exhaust port that is open to a cylinder head of an internal combustion engine and an exhaust manifold, and that includes an exhaust gas flow path through which exhaust gas flows from the exhaust port to the exhaust manifold; and a coolant flow path that is formed inside of an adapter wall surrounding this exhaust gas flow path, and that cools the exhaust gas that flows through the exhaust gas flow path. There is a curved portion in the exhaust gas flow path. Also, a peel inhibiting portion is formed on an inner peripheral surface of the exhaust gas flow path in a region farther toward an inside of the curve than an exhaust gas flow path center line of this curved portion.

8 Claims, 20 Drawing Sheets

FIG. 19A
FIG. 19B
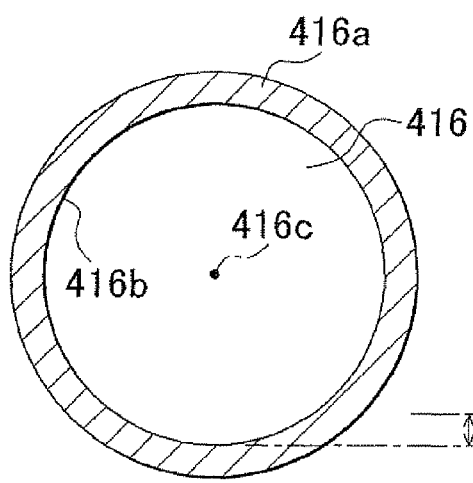
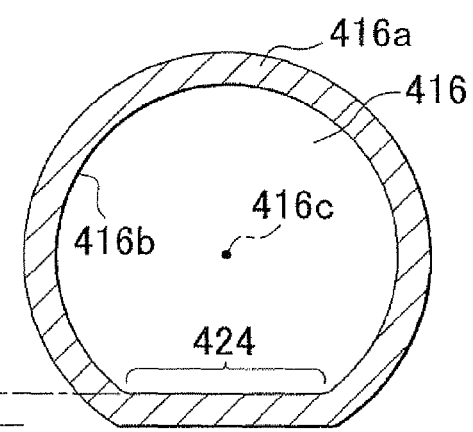

F I G . 24
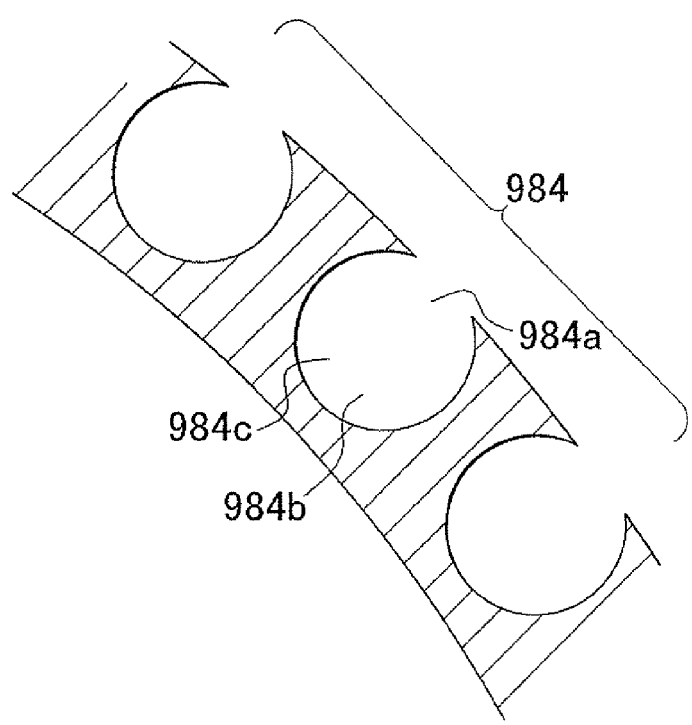

EXHAUST GAS COOLING ADAPTER

INCORPORATION BY REFERENCE

The disclosure of Japanese Patent Application No. 2011-025124 filed on Feb. 8, 2011 including the specification, drawings and abstract is incorporated herein by reference in its entirety.

BACKGROUND OF THE INVENTION

1. Field of the Invention

The invention relates to an exhaust gas cooling adapter that forms an exhaust gas flow path that is arranged between an exhaust port that is open to a cylinder head of an internal combustion engine and an exhaust manifold, and through which exhaust gas flows from the exhaust port to the exhaust manifold, and a coolant flow path that is formed inside an adapter wall surrounding this exhaust gas flow path, and that cools the exhaust gas that flows through the exhaust gas flow path.

2. Description of Related Art

Japanese Patent Application Publication No. 2000-291437 (JP-A-2000-291437), Japanese Patent Application Publication No. 2003-227695 (JP-A-2003-227695), Japanese Patent Application Publication No. 2010-190064 (JP-A-2010-190064), and Japanese Patent Application Publication No. 10-317995 (JP-A-10-317995) each describe technology for cooling exhaust gas in order to prevent heat damage to an internal combustion engine exhaust system. JP-A-2000-291437 describes technology in which a recessed portion is formed at a portion where fuel components tend to accumulate, in order to prevent fuel components from accumulating on a wall surface of a passage through which fuel component-containing gas flows. Here, the portion where fuel components tend to accumulate is, for example, a portion where the sectional area of the passage is large and the flow of gas is relatively small, or a wall surface on the inside of a curved passage where the flow of gas is relatively weak, or the like.

JP-A-2003-227695 describes technology in which concavo-convex dimples are formed on an inside wall of a bonnet of an exhaust gas cooling apparatus for a diesel engine. As a result, exhaust gas that flows near the inside wall surface of the bonnet will not peel away from the inside wall of the bonnet, so the flow of exhaust gas will not become stagnant at a portion off to the outside of the center portion, and as a result, PM will not adhere and accumulate.

JP-A-2010-190064 describes technology in which inner fins and dimples are formed on the surface of a tube of an exhaust gas heat exchange portion. These inner fins and dimples make it possible to obtain a turbulence effect on EGR gas, thereby improving the heat transfer coefficient on the EGR gas side, and thus making it possible to improve heat exchange performance.

JP-A-10-317995 describes technology in which an inner wall surface of at least a portion of an exhaust port is formed along the flow direction of exhaust gas. As a result, the amount of generated heat that is recovered by coolant is increased without excessively increasing the load on the internal combustion engine, by further forming fins in the flow direction of the exhaust gas.

Just as with an internal combustion engine to be mounted in a vehicle, in order to save space, it is necessary to curve an exhaust passage in an exhaust gas cooling adapter that is connected to an exhaust port of an internal combustion engine in order to ensure cooling performance of the exhaust gas cooling adapter.

However, when the exhaust passage is curved in this way, the exhaust gas flow may peel away from the inside surface of the exhaust gas passage on the inside of the curve particularly at regions with a high gas flowrate, and as a result, cooling efficiency may end up decreasing. The technology described in JP-A-2000-291437 prevents the accumulation of soot by creating turbulence in the gas flow by forming a recessed portion on the wall surface. In JP-A-2000-291437, peeling of the flow is not described and there is also no mention of heat exchange.

JP-A-2003-227695 describes concavo-convex-shaped dimples provided on a tapered bonnet that increases in diameter in order to deliver exhaust gas to a heat exchange portion. However, the heat exchange portion is not provided at a portion that is curved, and if the heat exchange portion were curved, just how it would be curved is not addressed.

The technology described in JP-A-2010-190064 has inner fins and dimples on the inside of a straight tube, but they not intended to inhibit peeling of the flow at a curved portion of a tube, and a curve in the tube is not addressed.

With the technology described in JP-A-10-317995, fins are formed along the flow, but peeling of the flow at the curved portion of the exhaust port is not able to be dealt with.

SUMMARY OF THE INVENTION

The invention provides an exhaust gas cooling adapter capable of improving the cooling efficiency of exhaust gas from an internal combustion engine, by inhibiting an exhaust gas flow from peeling at a curved portion of an exhaust gas flow path.

A first aspect of the invention relates to an exhaust gas cooling adapter. This exhaust gas cooling adapter that is arranged between an exhaust port that is open to a cylinder head of an internal combustion engine and an exhaust manifold includes an exhaust gas flow path and through which exhaust gas flows from the exhaust port to the exhaust manifold; and a coolant flow path that is formed inside of an adapter wall surrounding this exhaust gas flow path, and that cools the exhaust gas that flows through the exhaust gas flow path. There is a curved portion in the exhaust gas flow path, and a peel inhibiting portion is formed on an inner peripheral surface of the exhaust gas flow path in a region farther toward an inside of the curve than an exhaust gas flow path center line of this curved portion; and the coolant flow path is formed inside of the adapter wall in a region on the inside of the curve.

At the curved portion of the exhaust gas flow path, the peel inhibiting portion is formed on the inner peripheral surface in the region farther toward the inside of the curve than the exhaust gas flow path center line. Therefore, the flow of exhaust gas that flows through the exhaust gas flow path will not easily peel away from the inner peripheral surface on the inside of the curve, so the exhaust gas flow mass that contacts the inner peripheral surface of the exhaust gas flow path can be sufficiently maintained. As a result, the ability to transfer heat from the inner peripheral surface to the exhaust gas flow path wall can be sufficiently improved even at the region on the inside of the curve.

Moreover, the coolant flow path is formed in the adapter wall in the region on the inside of the curve, so the amount of heat that is transferred into the adapter wall is quickly absorbed by coolant, thereby improving the exhaust gas cooling efficiency.

In this way, the exhaust gas flow will not peel at the curved portion of the exhaust gas flow path in the exhaust gas cooling adapter, so the exhaust gas cooling efficiency is able to be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 19A is a sectional view taken along line X-X in FIG. 18, and FIG. 19B is a sectional view taken along line Y-Y in FIG. 18;

FIG. 24 is a sectional view of the shape of a recessed portion according to another example embodiment of the invention.

DETAILED DESCRIPTION OF EMBODIMENTS

First Example Embodiment (Structure)

Figure 1:
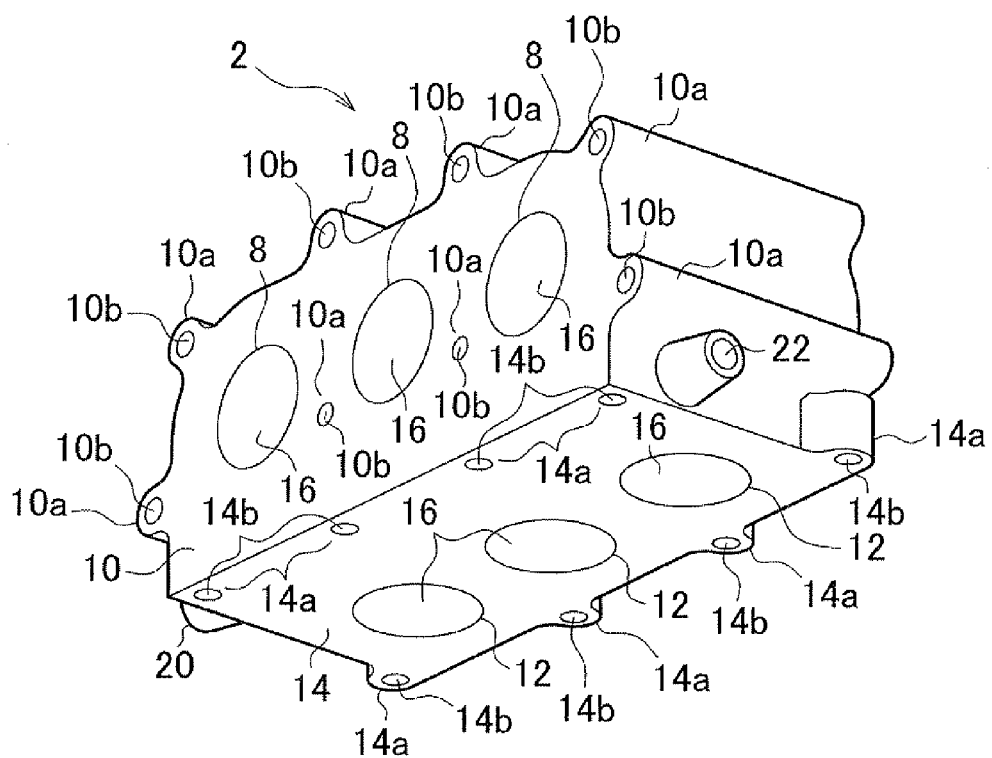
FIG. 1 is a perspective view looking up at an exhaust gas cooling adapter according to a first example embodiment of the invention.
Figure 2:
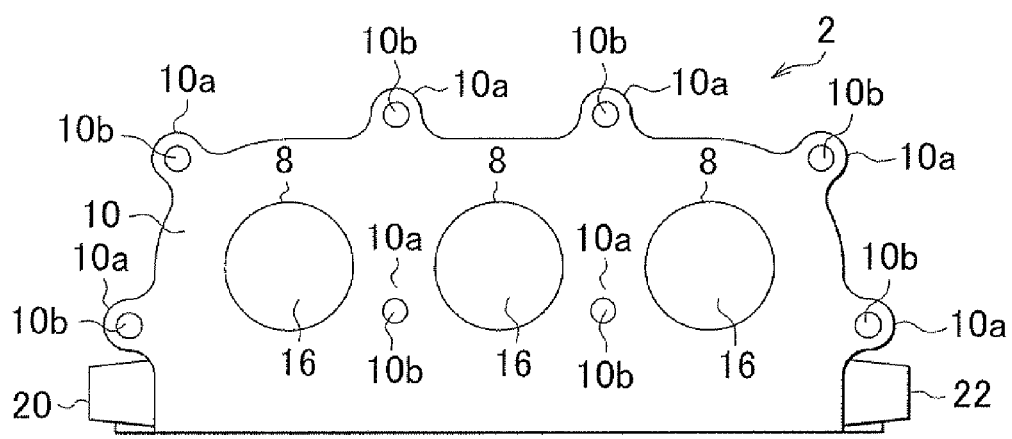
FIG. 2 is a front view of the exhaust gas cooling adapter according to the first example embodiment.
Figure 3:
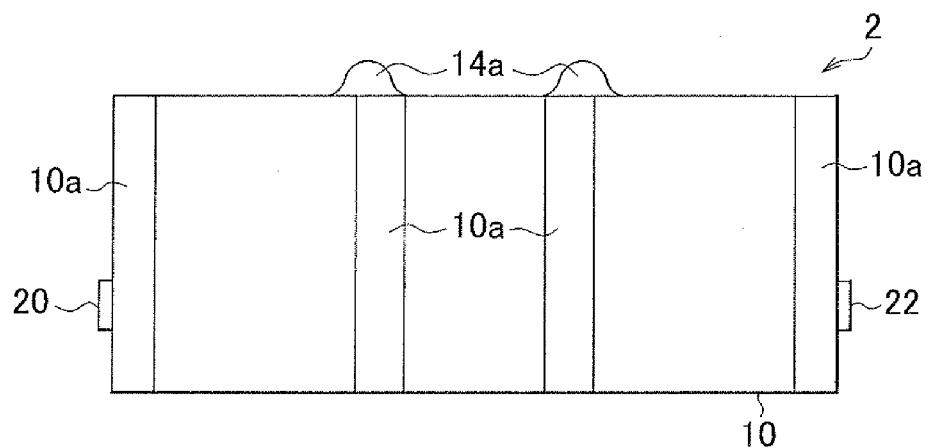
FIG. 3 is a plan view of the exhaust gas cooling adapter according to the first example embodiment.
Figure 4:
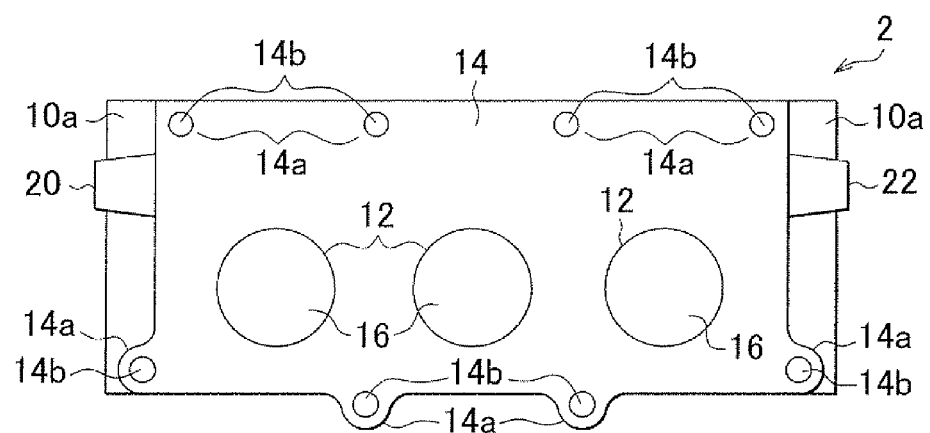
FIG. 4 is a bottom view of the exhaust gas cooling adapter according to the first example embodiment.
Figure 5:
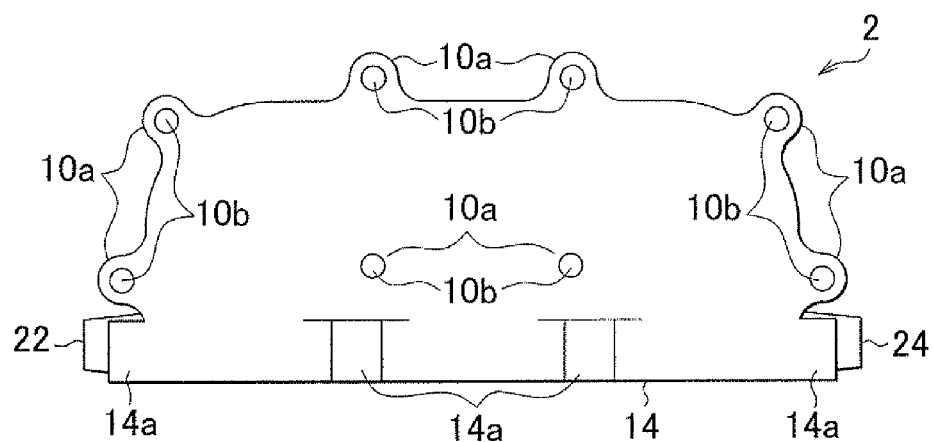
FIG. 5 is a rear view of the exhaust gas cooling adapter according to the first example embodiment.

The outer shape of an exhaust gas cooling adapter 2 to which the invention described above has been applied will be described with reference to FIGS. 1 to 9. As shown by the broken lines in FIGS. 6 and 7, the exhaust gas cooling adapter 2 is arranged between an exhaust manifold 6 and an exhaust port 4a that is open in a cylinder head 4 of an internal combustion engine. This exhaust gas cooling adapter 2 cools exhaust gas discharged from the exhaust port 4a and then discharges the cooled exhaust gas to the exhaust manifold 6 side.

In this first example embodiment, the exhaust gas cooling adapter 2 is described as being applied to each bank of cylinders in an internal combustion engine that is a V-type six cylinder (V6) engine. However, the invention may be applied to a variety of other types of internal combustion engines, such as an inline four cylinder engine or a V-type eight cylinder (V8) engine, by changing the number of exhaust gas flow paths.

This kind of exhaust gas cooling adapter 2 is cast from metal material such as aluminum alloy or iron alloy, for example, and a cylinder head side connecting surface 10 with exhaust inlets 8 open in it is formed on the exhaust upstream side. The exhaust inlets 8 are provided corresponding to the number and arrangement of the exhaust ports 4a in the cylinder head 4. In this case, three exhaust inlets 8 are provided in a straight line.

An exhaust manifold side connecting surface 14 with exhaust outlets 12 open in it is formed on the exhaust downstream side. Three exhaust outlets 12 are provided in a straight line, corresponding to the exhaust gas flow paths 6b in the exhaust manifold 6.

The exhaust manifold side connecting surface 14 is substantially orthogonal to the cylinder head side connecting surface 10. Also, each exhaust inlet 8 provided in the cylinder head side connecting surface 10 and each exhaust outlet 12 provided in the exhaust manifold side connecting surface 14 is connected to a respective one of three exhaust gas flow paths 16 formed inside the exhaust gas cooling adapter 2.

Bolt fastening portions 10a for bolting the exhaust gas cooling adapter 2 itself to an adapter connecting surface 4b on the cylinder head 4 side are formed on the exhaust gas cooling adapter 2. Bolt insertion holes 10b formed in the bolt fastening portions 10a are open to the cylinder head side connecting surface 10. The exhaust gas cooling adapter 2 can be fixed to the cylinder head 4 by inserting bolts through these bolt insertion holes 10b and screwing the bolts into threaded holes that are open in the adapter connecting surface 4b on the cylinder head 4 side. As a result, the exhaust ports 4a on the cylinder head 4 side are able to be connected to the exhaust gas flow paths 16 on the exhaust gas cooling adapter 2 side.

Moreover, bolt fastening portions 14a for bolting the exhaust manifold 6 to the exhaust gas cooling adapter 2 are formed on peripheral portions of the exhaust manifold side connecting surface 14. Threaded holes 14b that are open to the exhaust manifold side connecting surface 14 are formed in these bolt fastening portions 14a. The exhaust manifold 6 is connected to the exhaust gas cooling adapter 2 by bolts being screwed into these threaded holes 14b via through-holes formed in flanges 6a of the exhaust manifold 6. Accordingly, the exhaust gas flow paths 16 of the exhaust gas cooling adapter 2 are able to be connected to the exhaust gas flow paths 6b of the exhaust manifold 6.

Connecting the exhaust gas cooling adapter 2 via the cylinder head 4 and the exhaust manifold 6 enables exhaust gas discharged from the exhaust ports 4a to be cooled and discharged to the exhaust manifold 6 side.

Figure 10:
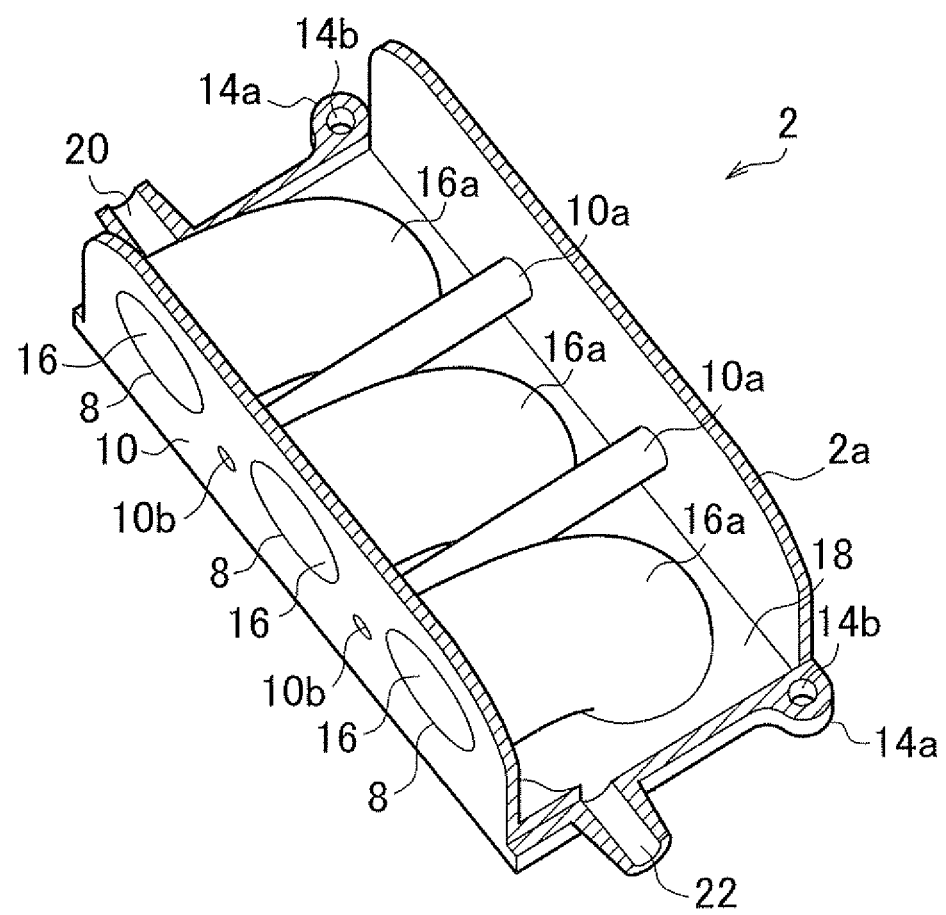
FIG. 10 is a partially fractured perspective view of the exhaust gas cooling adapter according to the first example embodiment.
Figure 11:
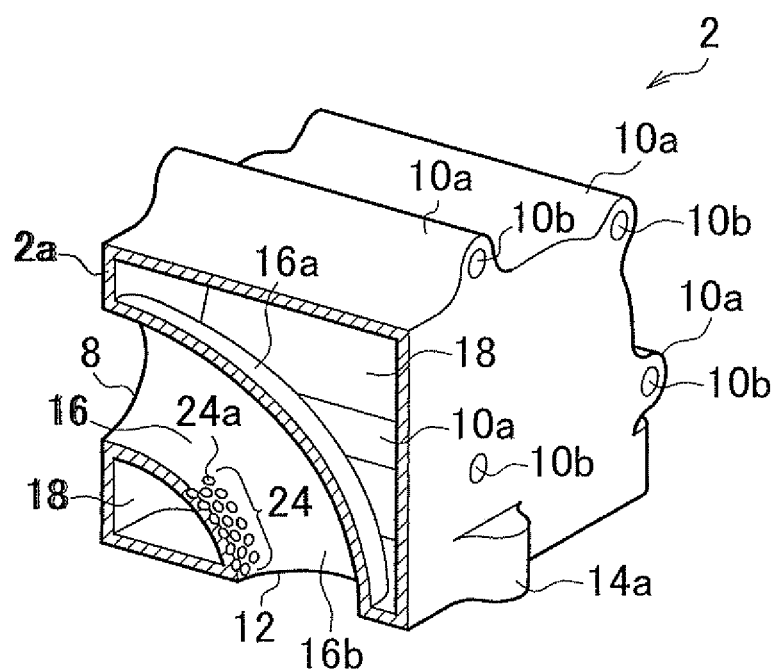
FIG. 11 is a longitudinal sectional view of the exhaust gas cooling adapter according to the first example embodiment.

FIGS. 10 and 11 are views in which an adapter wall 2a that forms the exhaust gas cooling adapter 2 is fractured so as to show the inside of the exhaust gas cooling adapter 2. A water jacket 18 that serves as a coolant flow path is formed, together with the exhaust flow paths 16, in the adapter wall 2a. Coolant is introduced into the water jacket 18 from a coolant inlet 20 and then discharged from a coolant outlet 22 after flowing through the water jacket 18. Hereinafter, portions and flow paths and the like will be described in the singular whenever possible to facilitate understanding of the invention. This coolant cools the exhaust gas that flows through the exhaust gas flow path 16 via an exhaust gas flow path wall 16a that is the adapter wall 2a surrounding the exhaust gas flow path 16.

Figure 12:
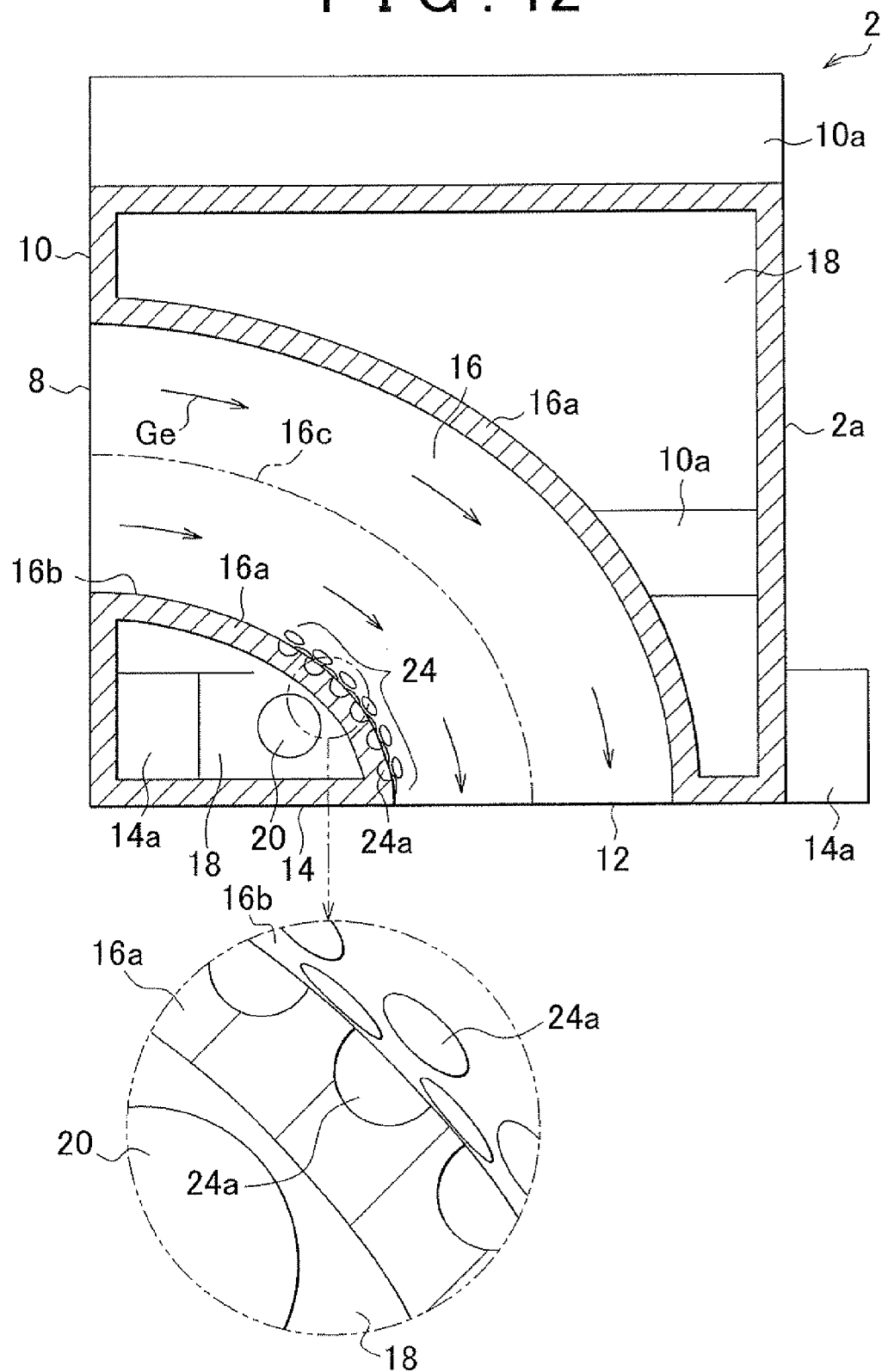
FIG. 12 is a longitudinal sectional view and a partial enlarged view of the exhaust gas cooling adapter according to the first example embodiment.

As shown in FIG. 12, the exhaust gas flow path 16 connects the cylinder head side connecting surface 10 and the exhaust manifold side connecting surface 14, that are generally orthogonal, together, so the entire exhaust gas flow path 16 is a curved portion. A peel inhibiting portion 24 is formed on an inner peripheral surface 16b of the exhaust gas flow path 16 that is entirely curved.

The peel inhibiting portion 24 is formed in a region farther toward the inside of the curve than an exhaust gas flow path center line 16c at the curved portion. Here, the peel inhibiting portion 24 is provided in a position where there is a particular tendency for an exhaust gas flow Ge to peel away from the inner peripheral surface 16b, in the region on the inside of the curve. Here, the peel inhibiting portion 24 is provided in a position where the degree of curvature of the curved portion is large.

The peel inhibiting portion 24 is configured such that a plurality of semispherical recessed portions 24a are distributed over the inner peripheral surface 16b of the exhaust gas flow path wall 16a. The coolant inlet 20 that introduces coolant into the water jacket 18 described above directs the flow of coolant toward a portion of the water jacket 18 that is on the inside of the curve of the exhaust gas flow path 16. Furthermore, the coolant outlet 22 discharges the coolant from a portion of the water jacket 18 that is on the inside of the curve of the exhaust gas flow path 16.

Therefore, particularly the flow mass and the flowrate of the coolant increase on the outer side of the exhaust gas flow path wall 16a in the region on the inside of the curve that is the side on which the peel inhibiting portion 24 is provided. In addition, the coolant inlet 20 and the coolant outlet 22 are arranged such that, in this region on the inside of the curve as well, the coolant flow becomes stronger particularly at the position of the peel inhibiting portion 24, i.e., the coolant flow becomes stronger on the downstream side of the exhaust gas flow path 16 than it is on the upstream side of the exhaust gas flow path 16.

At the portion on the inside of the curve of the water jacket 18, the bolt fastening portions 14a protrude at two locations between the exhaust gas flow paths 16, from the cylinder head side connecting surface 10 side, i.e., from the upstream side of the exhaust gas flow path 16, toward the inside of the water jacket 18. As a result, at the portion on the inside of the curve of the water jacket 18, the coolant passage sectional area is partly smaller on the upstream side of the exhaust gas flow path 16 than it is on the downstream side of the exhaust gas flow path 16.

(Operation)

The peel inhibiting portion 24 that is formed by the plurality of recessed portions 24a formed on the inner peripheral surface 16b creates turbulence in the exhaust gas flow Ge by the flow inside of the plurality of semispherical recessed portions 24a striking the flow outside of the recessed portions 24a. As a result, peeling is prevented on the downstream side on the inside of the curve where there is a particular tendency for the exhaust gas flow Ge to peel away from the inner peripheral surface 16b. Therefore, the exhaust gas flow Ge maintains a flow that sufficiently contacts the entire inner peripheral surface 16b of the exhaust gas flow path wall 16a even when the internal combustion engine is operating at a high speed.

(Effects)

(1) In this way, the exhaust gas flow Ge that flows through the exhaust gas flow path 16 will not easily peel away from the inner peripheral surface 16b on the inside of the curve, so the flow mass of the exhaust gas that contacts the inner peripheral surface 16b can be sufficiently maintained. As a result, the ability to transfer heat from the inner peripheral surface 16b to the exhaust gas flow path wall 16a that is part of the adapter wall 2a can be sufficiently improved even at the region on the inside of the curve.

Moreover, the water jacket 18 is formed in the adapter wall 2a at the region on the inside of the curve of the exhaust gas flow path 16, so the amount of heat that is transferred into the adapter wall 2a is quickly absorbed by coolant, thereby improving the exhaust gas cooling efficiency.

For example, compared with an exhaust gas flow path that is not curved, with an exhaust gas flow path that is curved 90°, as in this example embodiment, the cooling efficiency is approximately 50% lower if the peel inhibiting portion 24 is not provided. In contrast, with the exhaust gas flow path 16 of this example embodiment that is provided with the peel inhibiting portion 24, the cooling efficiency is improved a minimum of approximately 3% (when the exhaust gas flow Ge on the inside of the curve is the same as the flowrate on the outside of the curve), and a maximum of approximately 11% (when the flowrate of the exhaust gas flow Ge on the inside of the curve is maintained), compared to when the peel inhibiting portion 24 is not provided.

In this way, the exhaust gas flow Ge will not peel at the curved portion of the exhaust gas flow path 16 of the exhaust gas cooling adapter 2, so the exhaust gas cooling efficiency is able to be improved. (2) The peel inhibiting portion 24 is formed as recessed portions 24a, not convex portions, on the inner peripheral surface 16b of the exhaust gas flow path 16, in particular, and thus does not tend to create flow resistance, so back pressure of the internal combustion engine will not increase, and consequently the fuel efficiency of the internal combustion engine will not deteriorate.

Furthermore, the heat transfer area is increased by the recessed portions 24a, and the bottom surface of the recessed portions 24a comes close to the water jacket 18 in the adapter wall 2a, so the exhaust gas cooling efficiency is further increased. (3) The coolant inlet 20 and the coolant outlet 22 are arranged as described above, so the coolant flow becomes stronger on the downstream side of the exhaust gas flow path 16 where the peel inhibiting portion 24 is positioned than it does on the upstream side of the exhaust gas flow path 16, in the region on the inside of the curve.

Moreover, at the portion on the inside of the curve of the water jacket 18, the bolt fastening portion 14*a* makes the coolant passage sectional area smaller on the upstream side of the exhaust gas flow path 16 than on the downstream side of the exhaust gas flow path 16, as shown in FIG. 12. As a result, the flowrate of the coolant is faster, and thus the flow mass is greater, on the downstream side of the exhaust gas flow path 16 than it is on the upstream side of the exhaust gas flow path 16.

From this, the coolant efficiency for exhaust gas that is flowing at a high velocity farther toward the inside of the curve than the exhaust gas flow path center line 16*c* can be sufficiently increased.

Second Example Embodiment (Structure)

Figure 13:
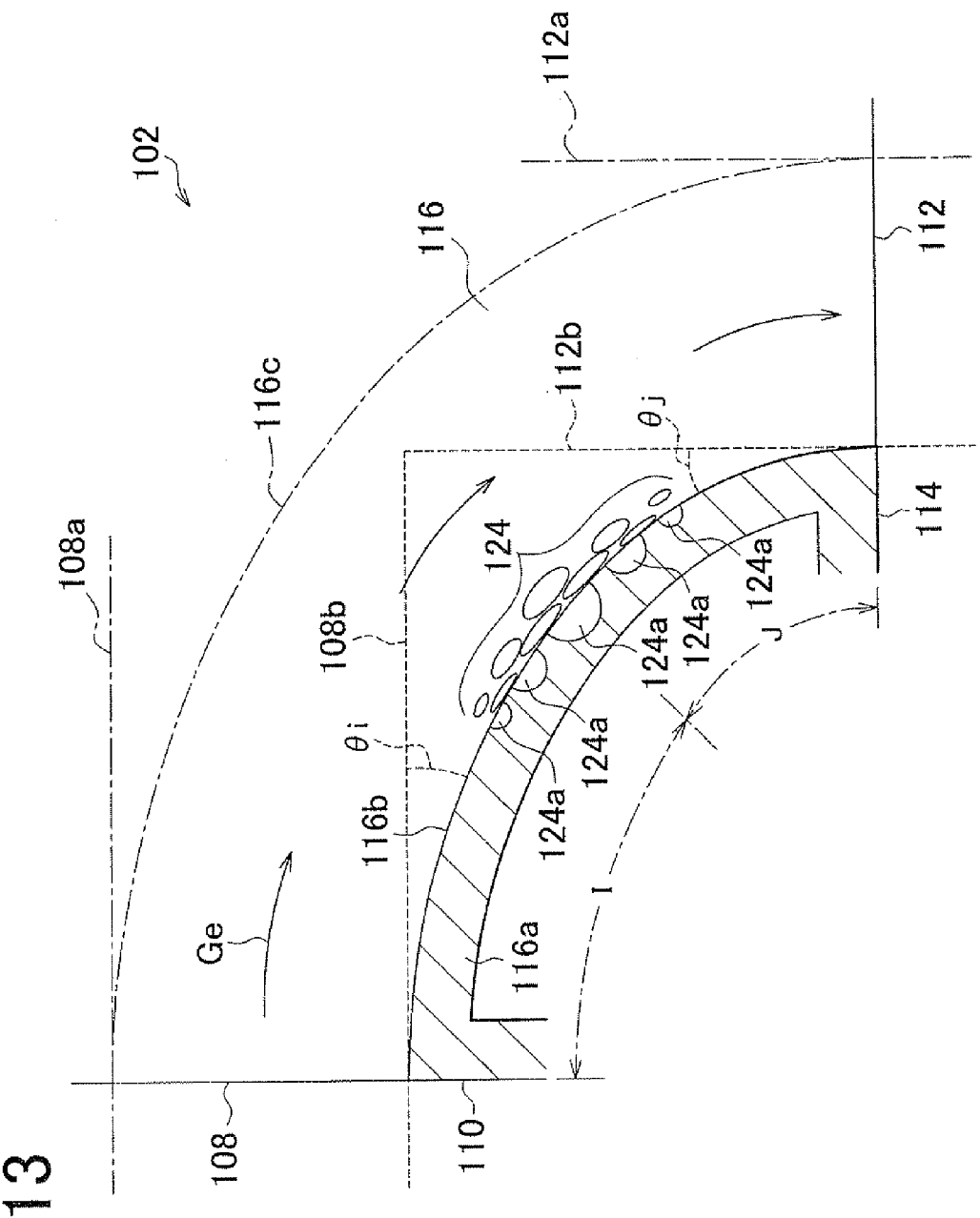
FIG. 13 is an enlarged longitudinal sectional view of the main portions of an exhaust gas cooling adapter according to a second example embodiment of the invention.

FIG. 13 is a view of the structure farther toward the inside of the curve than an exhaust gas flow path center line 116*c* in an exhaust gas cooling adapter 102 according to a second example embodiment. This exhaust gas cooling adapter 102 is similar in structure to the exhaust gas cooling adapter 2 of the first example embodiment with the exception of the structure of an exhaust gas flow path 116.

A peel inhibiting portion 124 of the exhaust gas cooling adapter 102 is formed in a region farther to the inside of the curve than an exhaust gas flow path center line 116*c* at the curved portion in the exhaust gas flow path 116, similar to the first example embodiment described above. However, both the depth and the open area of semispherical recessed portions 124*a* increase in positions where the degree of curvature (i.e., curve angle θi and θj) of the exhaust gas flow path 116 is greater.

Figure 14:
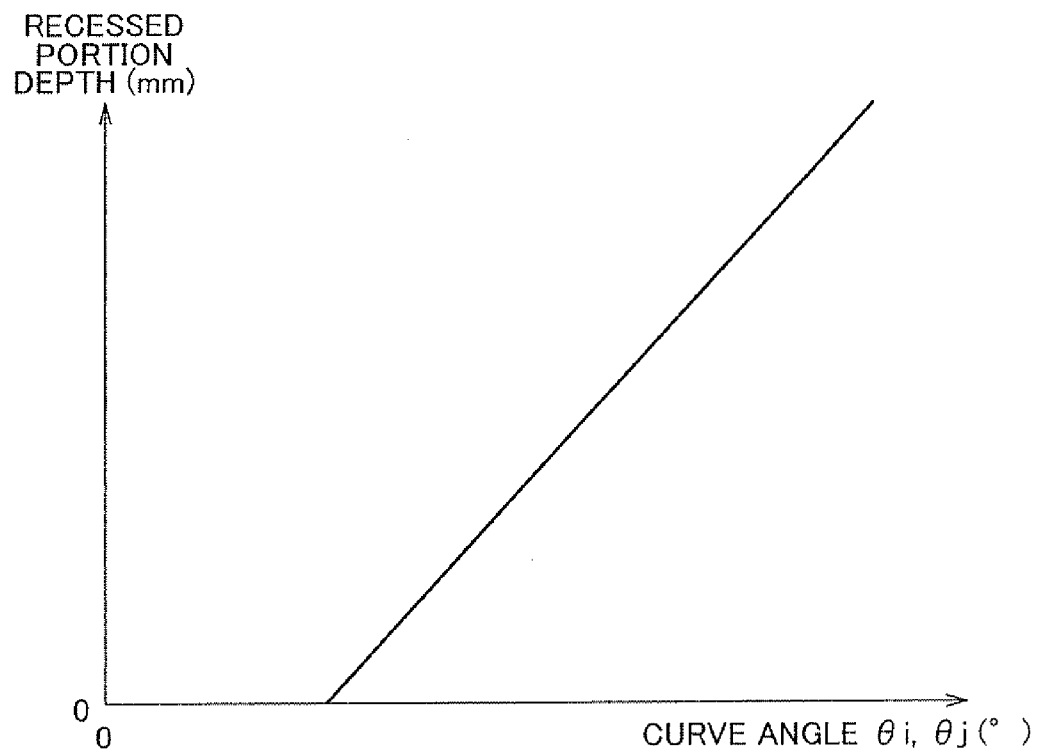
FIG. 14 is a graph showing the relationship between the recessed portion depth setting and the curve angle of the exhaust gas flow path according to the second example embodiment.

The depth (mm) of the recessed portions 124*a* with respect to the curve angle θi and θj is set as shown in FIG. 14. The recessed portions 124*a* are semispherical, so the open area (mm2) is proportional to the square of the depth (mm).

Here, on the side with an exhaust inlet 108 (i.e., region 1) that is open to a cylinder head side connecting surface 110, the degree of curvature (i.e., the curve angle θi and θj) is determined by the curve angle θi that is an angle created between the position on the innermost side of the curve in an inner peripheral surface 116*b* and a line 108*b* that is parallel to a center line 108*a* of the exhaust inlet 108. On the side with an exhaust outlet 112 (i.e., region J) that is open to an exhaust manifold side connecting surface 114, the degree of curvature (i.e., the curve angle θi and θj) is determined by the curve angle θj that is an angle created between the position on the innermost side of the curve in an inner peripheral surface 116*b* and a line 112*b* that is parallel to a center line 112*a* of the exhaust outlet 112.

Therefore, the depth and the open area of the recessed portions 124*a* are greatest at a position where the lines 108*b* and 112*b* intersect.

(Operation)

The exhaust gas flow Ge tends to peel away from the inner peripheral surface 116*b* in the region on the inside of the curve of the exhaust gas flow path 116, at positions where the curve angle θi and θj is greater. In this example embodiment, both the depth and the open area of the semispherical recessed portions 124*a* increase according to this.

Having the depth and the open area of the semispherical recessed portions 124*a* increase in this way strengthens the operation of inhibiting peeling by creating stronger turbulence described in the first example embodiment in positions where peeling of the exhaust gas flow Ge tends to occur more easily.

(Effects)

In addition to the effects of the first example embodiment described above, the peel inhibiting force is increased by strengthening the turbulence caused by the recessed portions 124*a*, according to how easily the exhaust gas flow Ge tends to peel due to the curve angle θi and θj, so peeling can be more appropriately inhibited. Moreover, at a portion where the curve angle θi and θj is small, both the depth and the open area of the recessed portions 124*a* are reduced, including a case in which the recessed portions 124*a* are not formed at all. Therefore, even if the flowrate of the exhaust gas flow Ge decreases due to the recessed portions 124*a*, this decrease can be kept to a minimum, so an increase in back pressure of the internal combustion engine can be avoided. Furthermore, that amount of condensation water that accumulates on the recessed portions 124*a* can also be reduced.

Third Example Embodiment (Structure)

Figure 15:
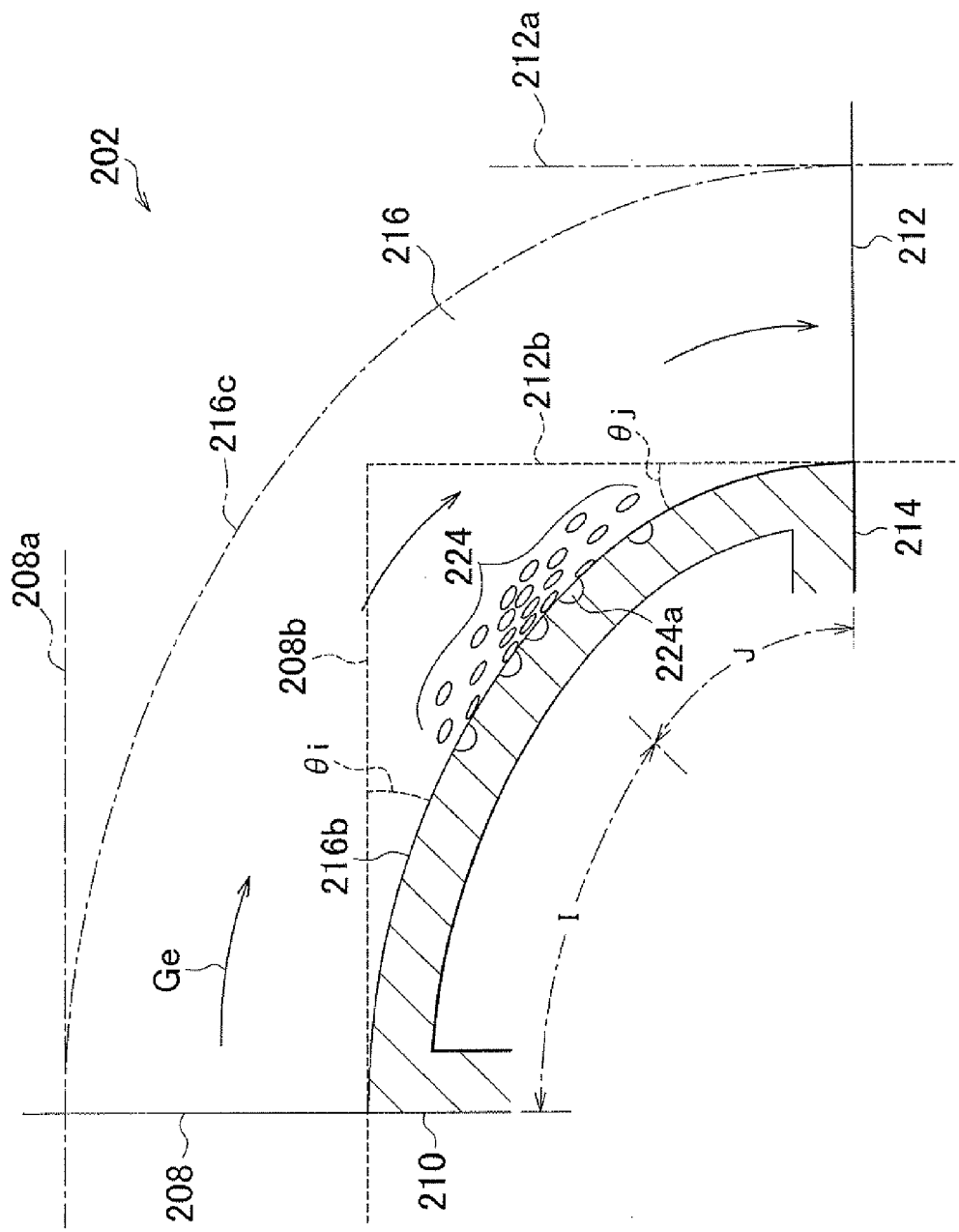
FIG. 15 is an enlarged longitudinal sectional view of the main portions of an exhaust gas cooling adapter according to a third example embodiment of the invention.

FIG. 15 is a view of the structure farther toward the inside of the curve than an exhaust gas flow path center line 216*c* in an exhaust gas cooling adapter 202 according to a third example embodiment. This exhaust gas cooling adapter 202 is similar in structure to the exhaust gas cooling adapter 2 of the first example embodiment with the exception of the structure of an exhaust gas flow path 216.

A peel inhibiting portion 224 of the exhaust gas cooling adapter 202 is formed in a region farther to the inside of the curve than the exhaust gas flow path center line 216*c* at the curved portion in the exhaust gas flow path 216, similar to the first example embodiment described above. However, the distribution density of semispherical recessed portions 224*a* increases in positions where the degree of curvature (i.e., the curve angle θi and θj) of the exhaust gas flow path 216 is greater.

Figure 16:
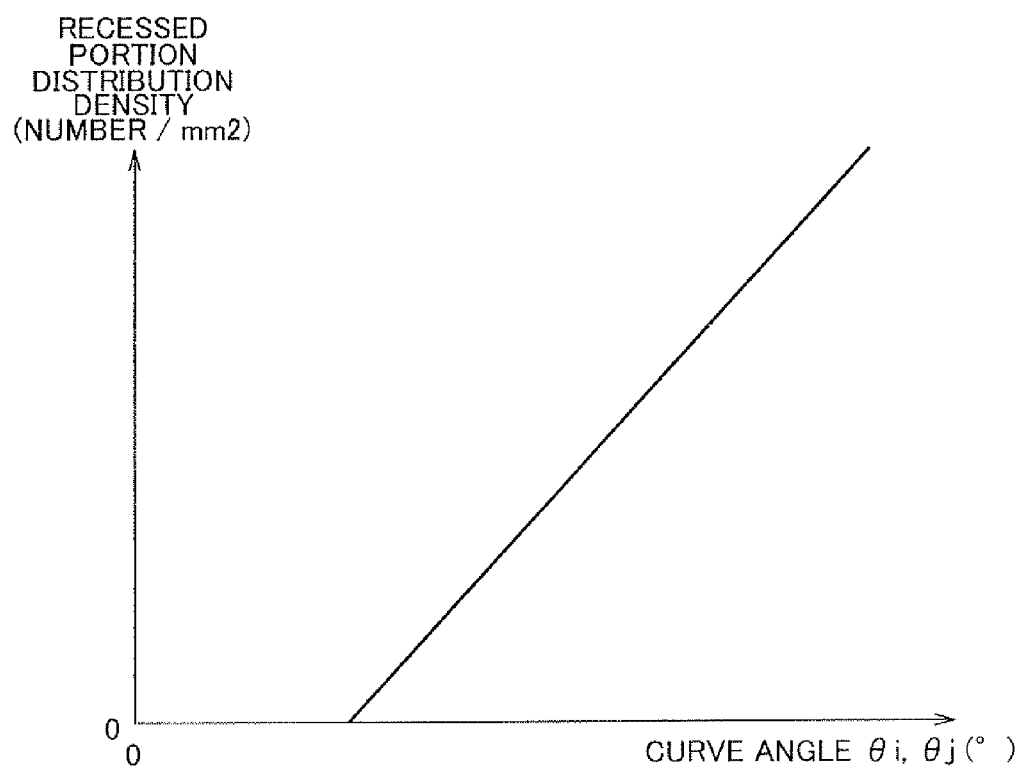
FIG. 16 is a graph showing the relationship between the recessed portion depth setting and the curve angle of the exhaust gas flow path according to the third example embodiment.

The distribution density (i.e., the number per mm2) of the recessed portions 224*a* with respect to the curve angle θi and θj is set as shown in FIG. 16. The size of the recessed portions 224*a* does not change. The curve angle θi and θj, the region I on the side with an exhaust inlet 208 that opens to a cylinder head side connecting surface 210, and region J on the side with an exhaust outlet 212 that opens to an exhaust manifold side connecting surface 214 are as described in the second example embodiment described above.

Therefore, as described in the second example embodiment described above, the distribution density of the recessed portions 224*a* is greatest at the position where lines 208*b* and 212*b* that are parallel to center lines 208*a* and 212*a* of an exhaust inlet 208 and an exhaust outlet 212 intersect.

(Operation)

The exhaust gas flow Ge tends to peel away from the inner peripheral surface 216*b* easier in the region on the inside of the curve of the exhaust gas flow path 216 at positions where the curve angle θi and θj is greater. In this example embodiment, the distribution density of the semispherical recessed portions 224*a* increases according to this.

Having the distribution density of the semispherical recessed portions 224*a* increase in this way strengthens the operation of inhibiting peeling by creating stronger turbulence described in the first example embodiment in positions where peeling of the exhaust gas flow Ge tends to occur more easily.

(Effects)

In addition to the effects of the first example embodiment described above, the peel inhibiting force is increased by strengthening the turbulence caused by the recessed portions 224a, according to how easily the exhaust gas flow Ge tends to peel due to the curve angle $\theta i$ and $\theta j$, so peeling can be more appropriately inhibited. Moreover, at a portion where the curve angle $\theta i$ and $\theta j$ is small, the distribution density of the recessed portions 224a is reduced, including a case in which the recessed portions 224a are not formed at all. Therefore, even if the flowrate of the exhaust gas flow Ge decreases due to the recessed portions 224a, this decrease can be kept to a minimum, so an increase in back pressure of the internal combustion engine can be avoided. Furthermore, the amount of condensation water that accumulates on the recessed portions 224a can also be reduced.

Fourth Example Embodiment (Structure)

Figure 17:
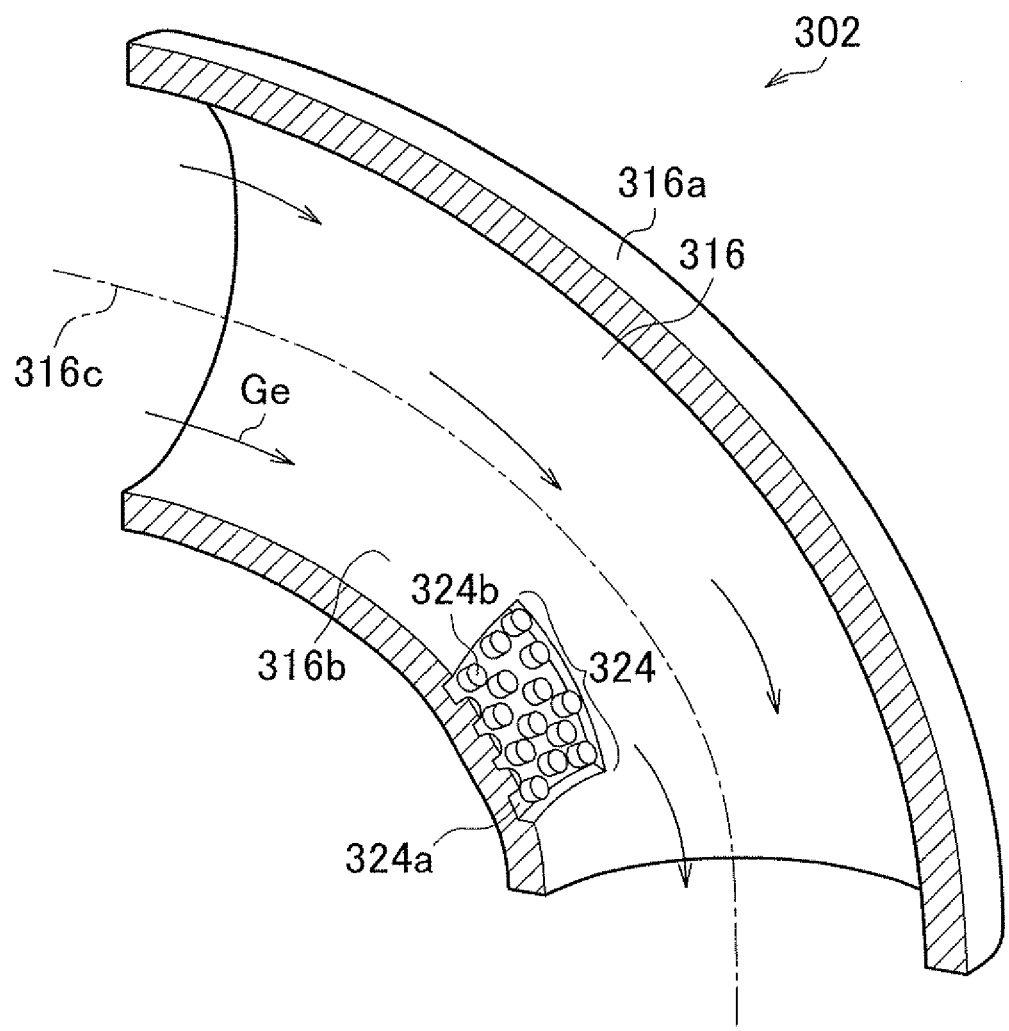
FIG. 17 is an enlarged longitudinal sectional view of the main portions of an exhaust gas cooling adapter according to a fourth example embodiment of the invention.

FIG. 17 is a view of the structure of an exhaust gas flow path 316 of an exhaust gas cooling adapter 302 according to a fourth example embodiment. This exhaust gas cooling adapter 302 is similar in structure to the exhaust gas cooling adapter 2 of the first example embodiment with the exception of the structure of the exhaust gas flow path 316.

An entire peel inhibiting portion 324 provided farther toward the inside of the curve than an exhaust gas flow path center line 316c is formed as a single recessed portion 324a on an inner peripheral surface 316b of an exhaust gas flow path wall 316a. Also, a plurality of protrusions 324b are formed in a region inside of this recessed portion 324a. The height of these protrusions 324b is within the depth of the recessed portion 324a.

That is, if the recessed portion 324a did not exist but instead there was an imaginary inner peripheral surface 316b over the recessed portion 324a, the height of these protrusions 324b would be no higher than the height of the imaginary inner peripheral surface 316b.

Therefore, the tip ends of the protrusions 324b are inside the recessed portion 324a and do not protrude out into the exhaust gas flow path 316.

(Operation)

With the peel inhibiting portion 324 in which the plurality of protrusions 324b that are formed on the inner peripheral surface 316b are housed, the exhaust gas flow Ge is disturbed by the protrusions 324b in the recessed portion 324a such that the flow that shoots out of the recessed portion 324a collides with the flow outside of the recessed portion 324a, thereby creating turbulence in the flow. As a result, the exhaust gas flow Ge is prevented from peeling even on the downstream side on the inside of the curve where the exhaust gas flow Ge has a tendency to peel. Therefore, the exhaust gas flow Ge maintains sufficient contact with the inner peripheral surface 316h of the exhaust gas flow path wall 316a even when the internal combustion engine is operating at a high speed.

(Effects)

The same effects as those obtained by the first example embodiment described above are obtained also with the peel inhibiting portion 324 in which the plurality of protrusions 324b are housed in the region inside the single recessed portion 324a in this way.

Fifth Example Embodiment (Structure)

Figure 18:
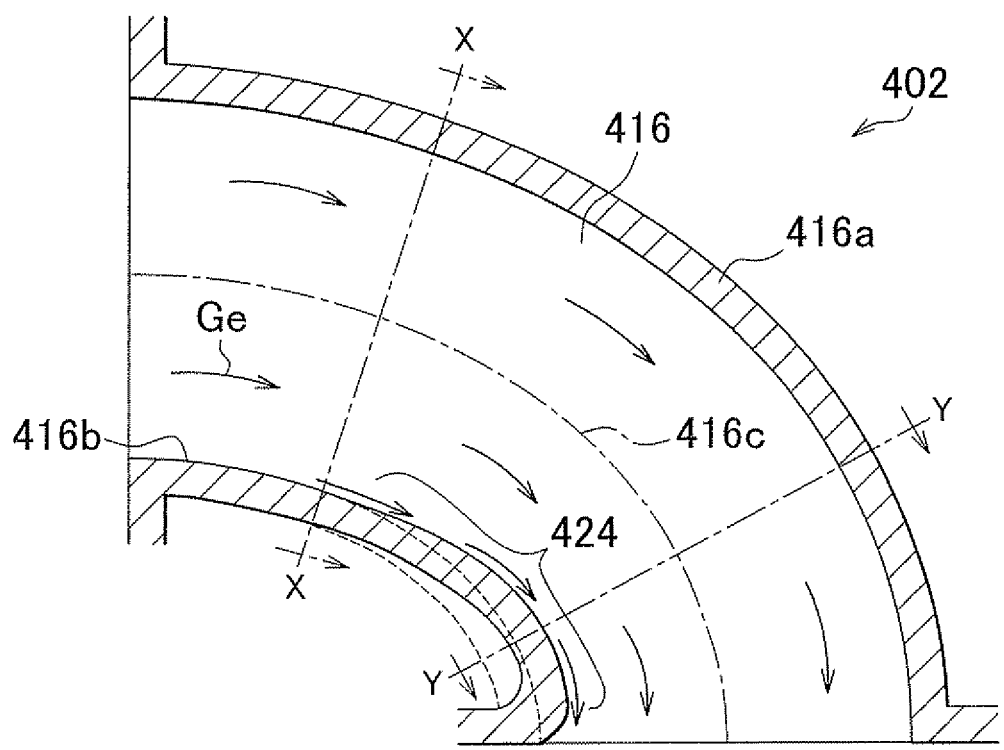
FIG. 18 is an enlarged longitudinal sectional view of the main portions of an exhaust gas cooling adapter according to a fifth example embodiment of the invention.

FIG. 18 is a view of the structure of an exhaust gas flow path 416 of an exhaust gas cooling adapter 402 according to a fifth example embodiment. This exhaust gas cooling adapter 402 is similar in structure to the exhaust gas cooling adapter 2 of the first example embodiment with the exception of the structure of the exhaust gas flow path 416.

A peel inhibiting portion 424 provided farther toward the inside of the curve than an exhaust gas flow path center line 416c on an inner peripheral surface 416b of an exhaust gas flow path wall 416a is shaped such that the inner peripheral surface 416b is raised up toward the exhaust gas flow path center line 416c side from a position that it would otherwise be in if the entire length of the exhaust gas flow path had a circular sectional shape as shown by the broken lines. The raised amount gradually increases from the upstream side of the exhaust gas flow path 416, corresponding to the degree of peeling of the exhaust gas flow Ge by the curved portion.

As a result, the cross section of the exhaust gas flow path 416 on the upstream side where the peel inhibiting portion 424 is not formed is circular, as shown in FIG. 19A, while the cross section of the exhaust gas flow path 416 on the downstream side where the peel inhibiting portion 424 is formed is such that the inner peripheral surface 416b on the inside of the curve is planar so as to be closer to the exhaust gas flow path center line 416c by the amount of distance D.

(Operation)

The rise in the inner peripheral surface 416b on the inside of the curve by the amount of the distance D corresponds to the peeling distance of the exhaust gas flow Ge that peels away from the inner peripheral surface 416b on the inside of the curve.

As a result, the inner peripheral surface 416b that corresponds to the region of the peel inhibiting portion 424 is able to contact the exhaust gas flow Ge that is actually flowing at a high velocity. Therefore, the exhaust gas flow Ge can be prevented from peeling even on the downstream side on the inside of the curve where the exhaust gas flow Ge has a tendency to peel. Therefore, the exhaust gas flow Ge maintains sufficient contact with the inner peripheral surface 416b of the exhaust gas flow path wall 416a even when the internal combustion engine is operating at a high speed.

(Effects)

(1) In this way, even with the smooth inner peripheral surface 416b, peeling of the exhaust gas flow Ge at the curved portion can be inhibited, so exhaust gas cooling efficiency is able to be improved.

(2) In particular, the peel inhibiting portion 424 is formed with a smooth surface and only occupies a position where the exhaust gas flow Ge becomes stagnant due to peeling, and thus does not tend to create flow resistance, so back pressure of the internal combustion engine will not increase, and consequently the fuel efficiency of the internal combustion engine will not deteriorate.

(3) The same effect as that described in (3) of the first example embodiment described above is obtained. (4) The entire inside of the curve is able to be kept flat and smooth, so condensation water and soot and the like will not easily accumulate.

Other Example Embodiments

In the second example embodiment described above, the depth and open area of the recessed portion change according to the curve angle $\theta i$ and $\theta j$, but only the depth of the recessed portion, or only the open area, may change according to the curve angle θi and θj. Further, the distribution density of the recessed portion, as in the third example embodiment, may also be combined with these.

In the fifth example embodiment described above, the peel inhibiting portion is shaped with the inner peripheral surface raised in a planar shape. Alternatively, however, aside from this, peel inhibiting portions 524 and 624 may be formed with the inner peripheral surface raised up by being shaped closer to a flat surface, i.e., with a large-diameter circumferential surface shape, as shown by exhaust gas flow paths 516 and 616 in FIGS. 20 and 21.

Figure 20A:
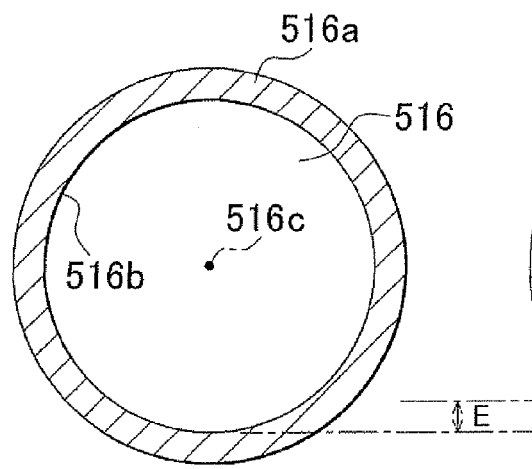
FIGS. 20A and 20B are sectional views showing the shape of an exhaust gas flow path according to another example embodiment of the invention.
Figure 20B:
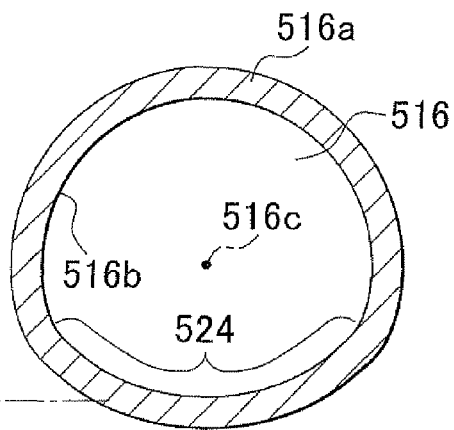

FIG. 20A is a view showing a round inner peripheral surface 516b of an exhaust gas flow path wall 516a on the upstream side where no peel inhibiting portion 524 is formed. FIG. 20B is a view showing the shape of the inner peripheral surface 516b of the exhaust gas flow path wall 516a on the downstream side where the peel inhibiting portion 524 is formed. As shown in the drawing, the peel inhibiting portion 524 that is formed farther toward the inside of the curve than an exhaust gas flow path center line 516c has a large-diameter circumferential surface shape. As a result, the inner peripheral surface 516b of the peel inhibiting portion 524 is raised up and comes closer to an exhaust gas flow path center line 516c by the amount of distance E.

Figure 21A:
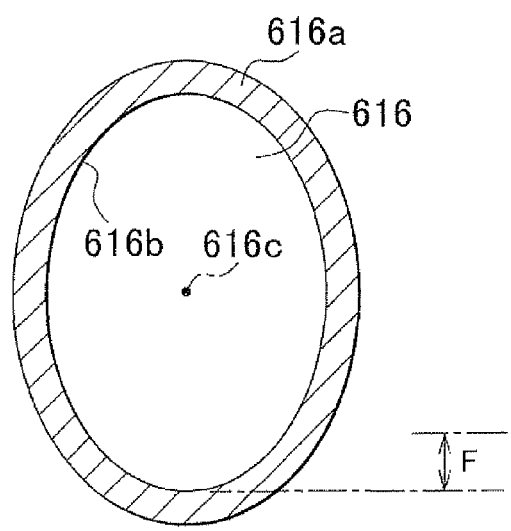
FIGS. 21A and 21B are sectional views showing the shape of an exhaust gas flow path according to still another example embodiment of the invention.
Figure 21B:
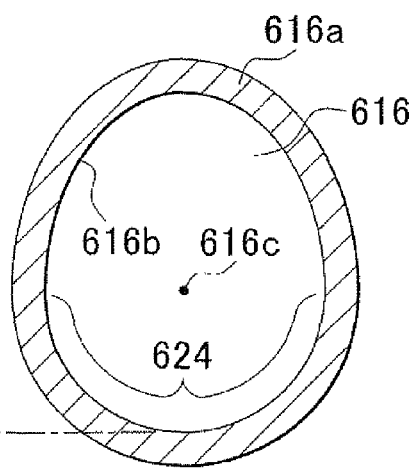

FIG. 21A is a view showing an oval inner peripheral surface 616b of an exhaust gas flow path wall 616a on the upstream side where no peel inhibiting portion 624 is formed. FIG. 21B is a view showing the shape of the inner peripheral surface 616b of the exhaust gas flow path wall 616a on the downstream side where the peel inhibiting portion 624 is formed. As shown in the drawing, the peel inhibiting portion 624 that is formed farther toward the inside of the curve than an exhaust gas flow path center line 616c is such that a long nose-shaped portion in FIG. 21A is a round circumferential surface shape in FIG. 21B. As a result, the inner peripheral surface 616b of the peel inhibiting portion 624 is raised up and is closer to an exhaust gas flow path center line 616c by the amount of distance F.

Figure 22:
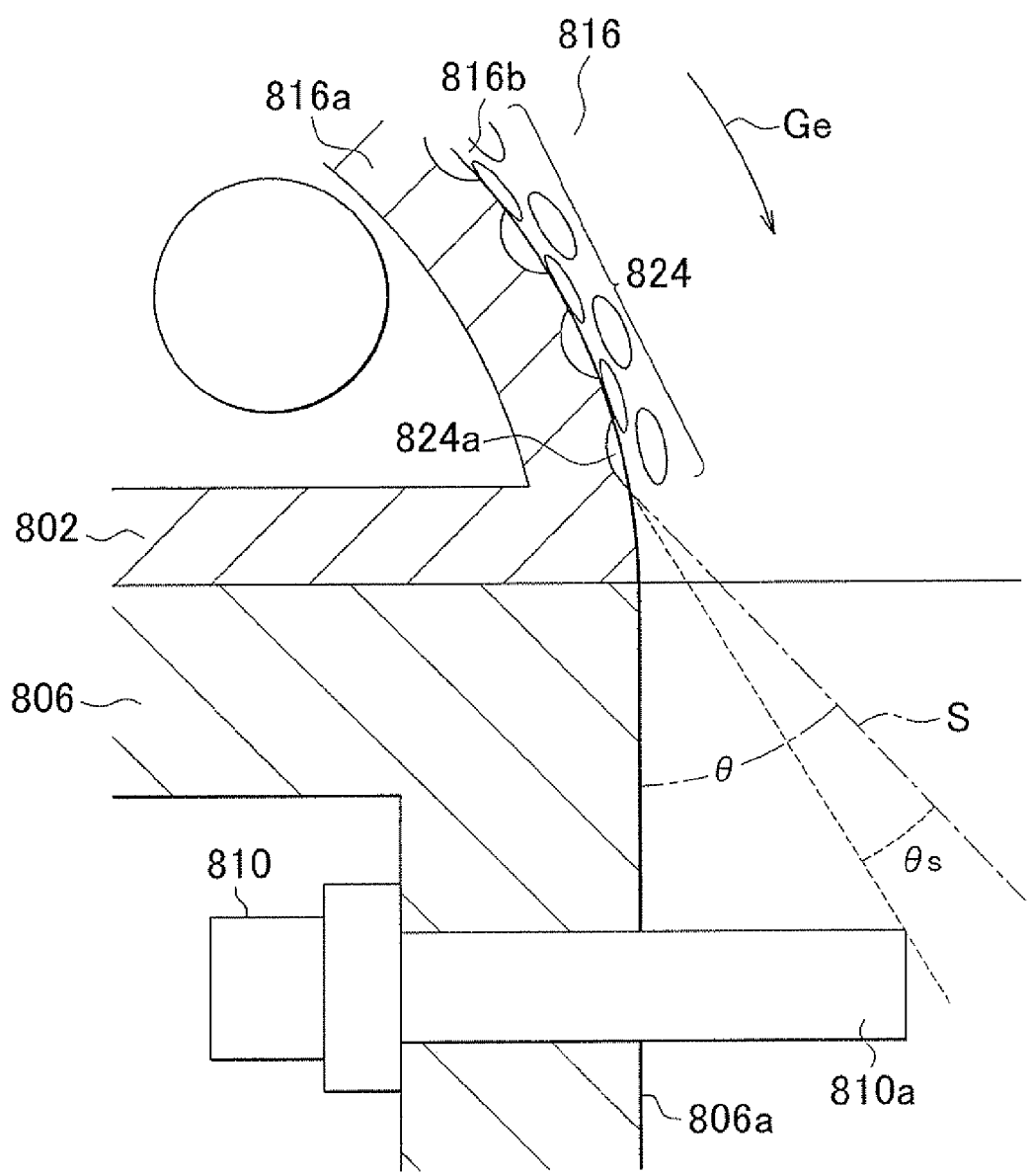
FIG. 22 is a sectional view of the arrangement relationship between a sensor and the shape of a recessed portion according to yet another example embodiment of the invention.

A sensor 810 such as an air-fuel ratio sensor may be arranged in an exhaust manifold 806 that is connected on the downstream side to an exhaust gas cooling adapter 802, as shown in FIG. 22. In the exhaust gas cooling adapter 802, condensation water may temporarily form on the inner peripheral surface 816b of an exhaust gas flow path wall 816a that forms an exhaust gas flow path 816 immediately after the internal combustion engine is started. If this condensation water runs down the inner peripheral surface 816b and into the recessed portion 824a of the peel inhibiting portion 824, it may be blown off from the edge of the recessed portion 824a by the exhaust gas flow Ge. In this case, the direction in which the condensation water is blown is a direction of a tangent line S of the inside surface of the recessed portion 824a. If a tip end portion 810a of the sensor 810 lies in the direction of this tangent line S, the condensation water may cover a detection mechanism on the tip end portion 810a, and thus affect the detection accuracy of the sensor 810.

Therefore, the tip end portion 810a of the sensor 810 is arranged in a region within an angle θ between the tangent line S and an inner peripheral surface 806a of the exhaust manifold 806, as shown in the drawing. As a result, an effect on the detection accuracy of the sensor 810 by condensation water inside the recessed portion 824a being blown off can be avoided.

Is should be noted that arranging the tip end portion 810a of the sensor 810 in a region between an angular position that is closer to the inner peripheral surface 806a of the exhaust manifold 806 by the amount of a predetermined angle θs from the tangent line S and the inner peripheral surface 806a of the exhaust manifold 806 may prevent even more reliably an effect from the blown off water.

Figure 23A:
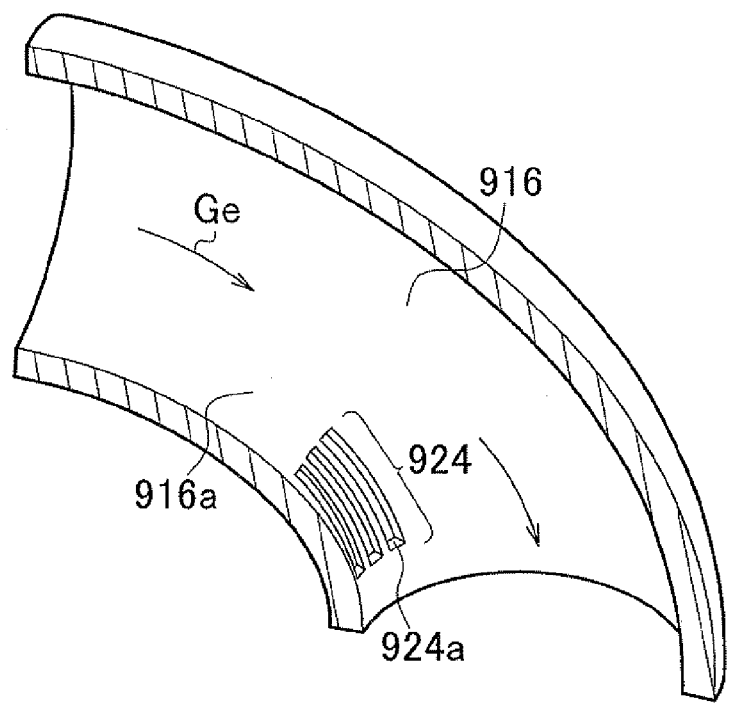
FIGS. 23A and 23B are longitudinal sectional perspective views of the shape of a recessed portion according to a further example embodiment of the invention.
Figure 23B:
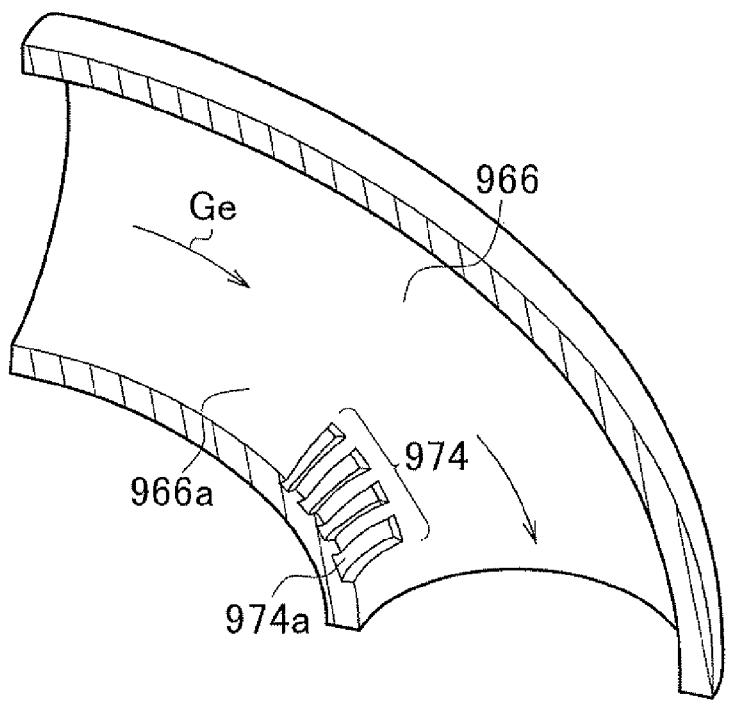

The peel inhibiting portion in each of the first to the third example embodiments described above is formed by a semi-spherical recessed portion, but it may also be formed by a recessed portion of another shape. For example, a peel inhibiting portion 924 that is formed by arranging a plurality of recessed portions 924a that are long and groove-shaped in the flow direction of the exhaust gas flow Ge may be formed on an inner peripheral surface 916a of an exhaust gas flow path 916, as shown in FIG. 23A. Alternatively, a peel inhibiting portion 974 that is formed by arranging a plurality of recessed portions 974a that are long and groove-shaped in a direction orthogonal to the flow direction of the exhaust gas flow Ge may be formed on an inner peripheral surface 966a of an exhaust gas flow path 966, as shown in FIG. 23B. Aside from this, the recessed portion may also be the shape of half of a spheroid.

In each of the example embodiments described above, an open portion of the recessed portion is wider than the space inside of the recessed portion, or the open portion of the recessed portion is than same width as the space inside of the recessed portion. Instead, however, a plurality of recessed portions 984c each having a recessed portion internal space 984b that is wider than an open portion 984a may be arranged to form a peel inhibiting portion 984, as shown in FIG. 24. As a result, when the flowrate of exhaust gas is low, such as when the internal combustion engine is cold started, the flow of exhaust gas will not easily enter the recessed portion internal spaces 984b, so heat loss during a cold start can be reduced, thus enabling an exhaust gas control catalyst to be activated earlier.

Figure 6:
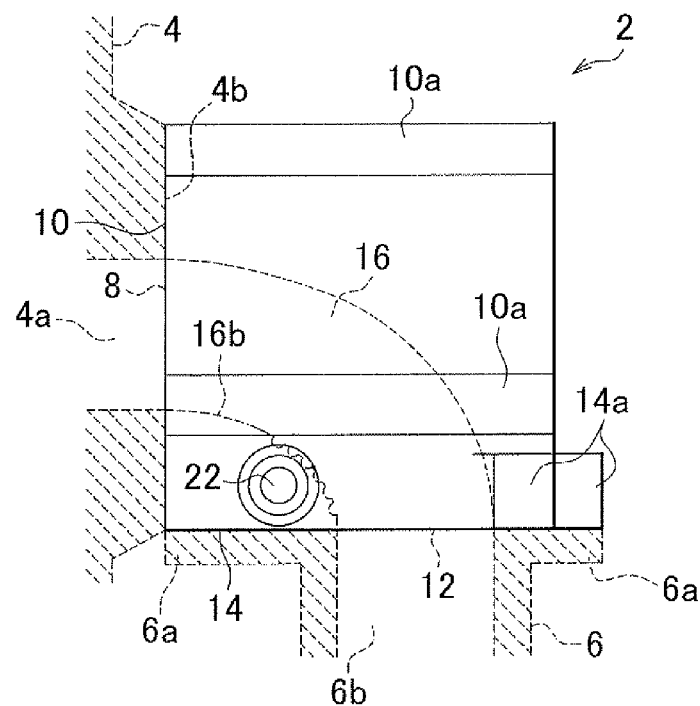
FIG. 6 is a right-side view of the exhaust gas cooling adapter according to the first example embodiment.
Figure 7:
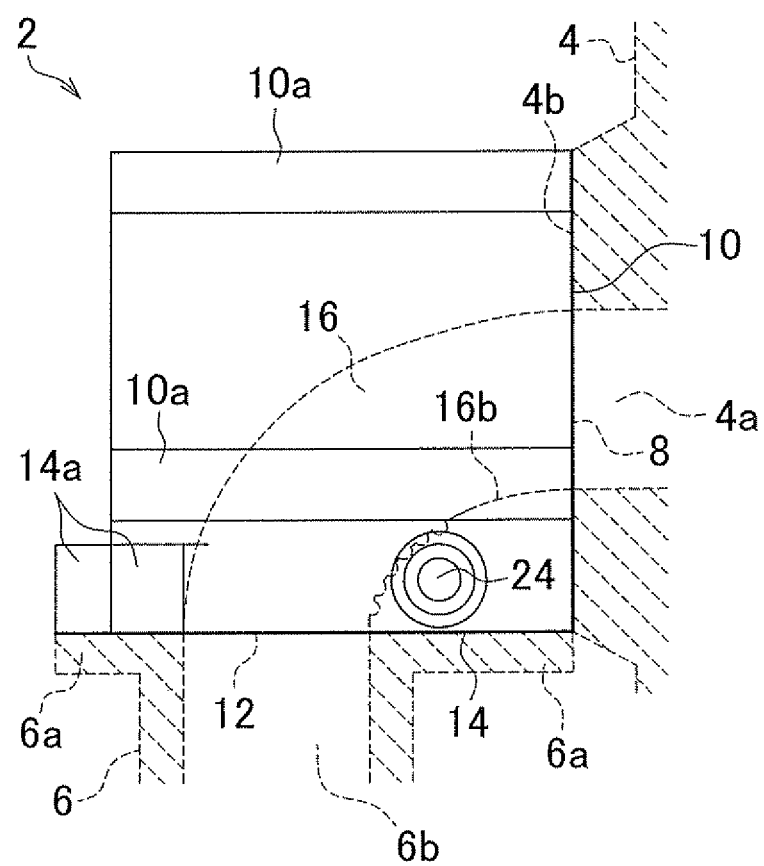
FIG. 7 is a left-side view of the exhaust gas cooling adapter according to the first example embodiment.
Figure 8:
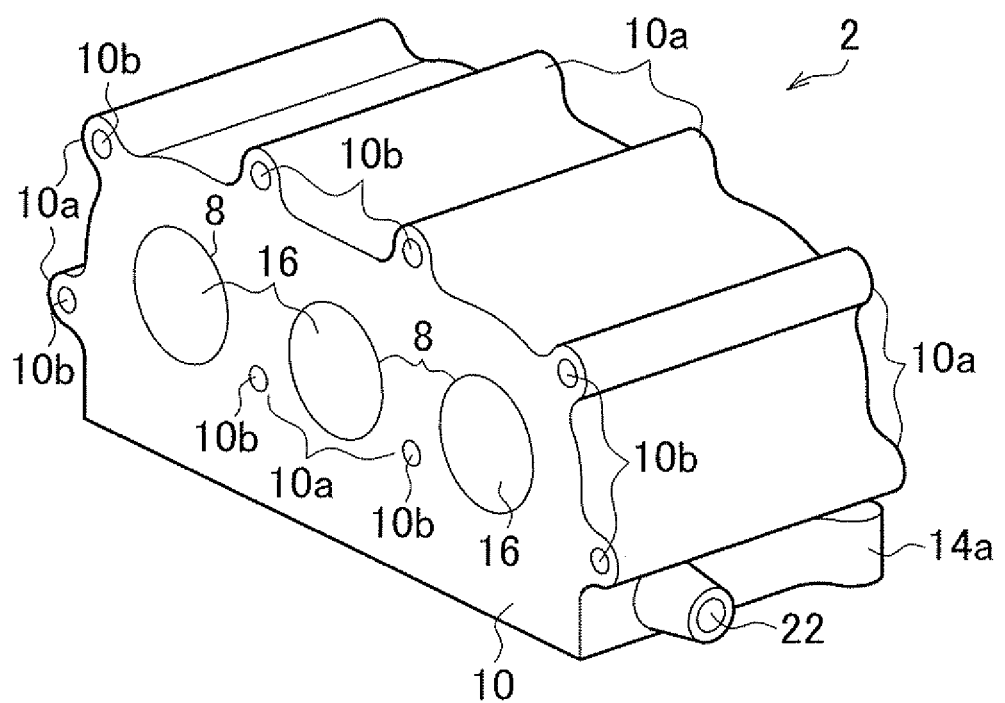
FIG. 8 is a perspective view looking down on the exhaust gas cooling adapter according to the first example embodiment.
Figure 9:
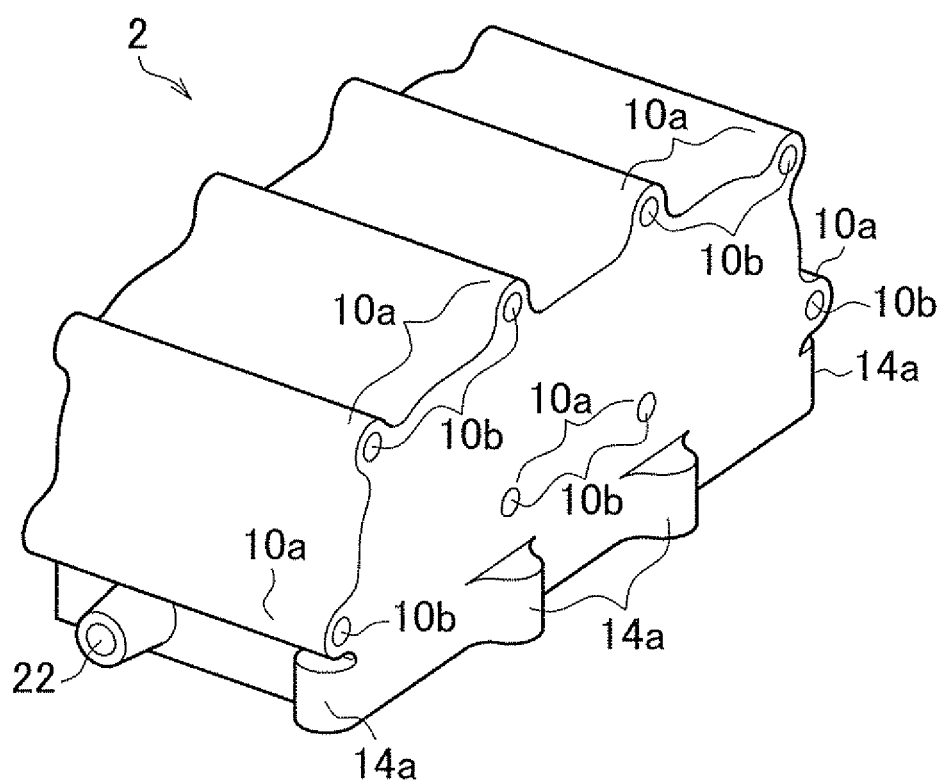
FIG. 9 is perspective view looking down from the rear side on the exhaust gas cooling adapter according to the first example embodiment.

In each of the example embodiments described above, at a portion on the inside of the curve of the water jacket 18, the flow mass and flowrate of coolant flow are made to be greater on the downstream side of the exhaust gas flow path 16 than they are on the upstream side of the exhaust gas flow path 16, by the arrangement of the coolant inlet 20 and the coolant outlet 22, and the protrusion of the bolt fastening portions 14a from the upstream side of the exhaust gas flow path 16, as shown in FIGS. 6, 7, and 12. Instead, however, one of the flow mass and the flowrate of the coolant flow may be made to be greater on the downstream side of the exhaust gas flow path 16 than it is on the upstream side of the exhaust gas flow path 16.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An exhaust gas cooling adapter that is arranged between an exhaust port that is open to a cylinder head of an internal combustion engine and an exhaust manifold, the exhaust gas cooling adapter comprising:

an exhaust gas flow path through which exhaust gas flows from the exhaust port to the exhaust manifold, the exhaust gas contacting an inner peripheral surface of the exhaust gas flow path as the exhaust gas flows from the exhaust port to the exhaust manifold; and a coolant flow path that is formed inside of an adapter wall surrounding the exhaust gas flow path, and that cools the exhaust gas that flows through the exhaust gas flow path,
wherein the exhaust gas flow path has a curved portion, and a peel inhibiting portion is formed on the inner peripheral surface of the exhaust gas flow path in a region farther toward an inside of a curve of the curved portion than an exhaust gas flow path center line of the curved portion; and the coolant flow path is formed inside of the adapter wall in a region on the inside of the curve of the curved portion.

2. The exhaust gas cooling adapter according to claim 1, wherein the peel inhibiting portion is a plurality of recessed portions provided on an inner peripheral surface of the exhaust gas flow path.

3. The exhaust gas cooling adapter according to claim 2, wherein at least one of a depth, a distribution density, and an open area of the recessed portions is greater at positions where the degree of curvature of the curved portion is greater.

4. The exhaust gas cooling adapter according to claim 1, wherein the peel inhibiting portion is formed as a recessed portion on the inner peripheral surface of the exhaust gas flow path, and a plurality of protrusions are formed in a region inside of the recessed portion, and if the recessed portion did not exist but instead there was an imaginary inner peripheral surface of the exhaust gas flow path over the recessed portion, a height of the protrusions is no greater than a height of the imaginary inner peripheral surface.

5. The exhaust gas cooling adapter according to claim 1, wherein a flow mass or a flowrate of coolant in the coolant flow path formed inside of the adapter wall in a region on the inside of the curve is greater on a downstream side of the exhaust gas flow path than on an upstream side of the exhaust gas flow path.

6. The exhaust gas cooling adapter according to claim 1, wherein the peel inhibiting portion is shaped with the inner peripheral surface of the exhaust gas flow path in the region on the inside of the curve raised up toward the exhaust gas flow path center line side.

7. The exhaust gas cooling adapter according to claim 1, wherein no peel inhibiting portion is formed on the inner peripheral surface of the exhaust gas flow path in a region farther toward an outside of the curve of the curved portion than the exhaust gas flow path center line of the curved portion.

8. The exhaust gas cooling adapter according to claim 1, wherein the peel inhibiting portion creates turbulence in the exhaust gas that flows past the peel inhibiting portion to thereby inhibit the exhaust gas from peeling away from the inner peripheral surface of the exhaust gas flow path.

* * * * *